United States Patent
Johnson

(10) Patent No.: US 7,424,791 B2
(45) Date of Patent: Sep. 16, 2008

(54) CABLE BRACKET APPARATUS

(75) Inventor: Bruce D. Johnson, Bloomington, MN (US)

(73) Assignee: Window Support Systems, Inc., Bloomington, MN (US)

( * ) Notice: Subject to any disclaimer, the term of this patent is extended or adjusted under 35 U.S.C. 154(b) by 720 days.

(21) Appl. No.: 10/928,794

(22) Filed: Aug. 27, 2004

(65) Prior Publication Data
US 2005/0246978 A1 Nov. 10, 2005

Related U.S. Application Data

(63) Continuation-in-part of application No. 10/832,695, filed on Apr. 27, 2004.

(51) Int. Cl.
*E06B 1/38* (2006.01)
(52) U.S. Cl. .............................. 52/201; 52/73; 52/148; 52/698; 248/208; 248/500
(58) Field of Classification Search .................. 52/148, 52/149, 151, 73, 702, 122.1, 127.2, 201, 52/295, 698; 248/327, 339, 295.11, 208, 248/499, 500, 506, 680, 681
See application file for complete search history.

(56) References Cited

U.S. PATENT DOCUMENTS

| | | | | |
|---|---|---|---|---|
| 337,225 A | * | 9/1886 | Anderson | 248/208 |
| 486,804 A | * | 11/1892 | Wood | 248/286.1 |
| 758,114 A | * | 4/1904 | Shertzer | 248/508 |
| 2,300,375 A | * | 10/1942 | Turner | 52/150 |
| 2,837,776 A | * | 6/1958 | Klein | 52/73 |
| 3,245,649 A | * | 4/1966 | Cassidy et al. | 24/68 R |
| 3,574,981 A | * | 4/1971 | Henschen | 52/127.2 |
| 3,724,151 A | * | 4/1973 | Kaywood et al. | 52/295 |
| 3,751,866 A | * | 8/1973 | Renchen | 52/149 |
| 3,830,457 A | * | 8/1974 | Stewart | 248/499 |
| 4,079,556 A | * | 3/1978 | Luck et al. | 52/127.2 |
| 4,272,933 A | * | 6/1981 | Lopes | 52/149 |
| 5,749,183 A | * | 5/1998 | Wright | 52/201 |
| 6,575,416 B1 | * | 6/2003 | Avinger | 248/307 |

* cited by examiner

*Primary Examiner*—Richard E. Chilcot, Jr.
*Assistant Examiner*—William V Gilbert
(74) *Attorney, Agent, or Firm*—Clayton R. Johnson

(57) ABSTRACT

The cable bracket mechanism is extendable between a cleat or clamp mounted to a building and a part of a bay or bow window that is remote from the building. The mechanism includes an elongated bracket having a a flange at one end extending about right angles to the main body and a reversely curved hook portion at the other end that is joined to the main body and is extended into a second bracket opening, a cable having one end connected to a building and at its opposite end to a stud extended through an aperture in the flange, the second bracket being mounted to the window, and a fastener threadable on the stud to bear against the flange for adjusting the tension in the cable.

5 Claims, 3 Drawing Sheets

CABLE BRACKET APPARATUS

RELATED APPLICATIONS

This application is a continuation-in-part of Ser. No. 10/832,695, filed Apr. 27, 2004.

BACKGROUND OF THE INVENTION

This invention relates apparatus for adjusting the tension in a cable that is being used in supporting other structure, for example bay and bow windows of a building.

At the present, there are devices that are mountable to a building for mounting one end portions of cables while the opposite end portions of the cables are attached to a load, for example bay and bow windows, to aid in supporting such a load in a desired condition.

In order to provide novel devices that are relatively inexpensive and usable to adjust the tension in a cable or a rope that is at least partially supporting a load, this invention has been made.

SUMMARY OF THE INVENTION

The cable bracket mechanism includes an elongated bracket having a flange at one end that generally extends at right angles to the main body of the bracket for having one end portion of a cable stud connected thereto and a hook portion at the opposite end of the main body for being connected through suitable mechanism to a load being supported. The other end of the cable is attached to a building by suitable means, for example by a cable clamp or cleat. The bracket and stud permit adjusting the tension in the cable.

An object of this invention is to provide new and novel means for adjusting the tension in a cable or rope that is utilized in supporting a load from a supporting structure. A further object of this invention is to provide new and novel cable bracket apparatus that is usable for at least partially supporting structure such as a bay or bow window and permitting easily making an adjustment to obtain a desired elevation and/or leveling of such windows. A still further object of the invention is to provide a new and novel bracket that is usable in conjunction with a cable for supporting structure such as a bay or bow window and facilitating the adjustment of tension in the cable.

DESCRIPTION OF THE PREFERRED EMBODIMENT

Figure 1:
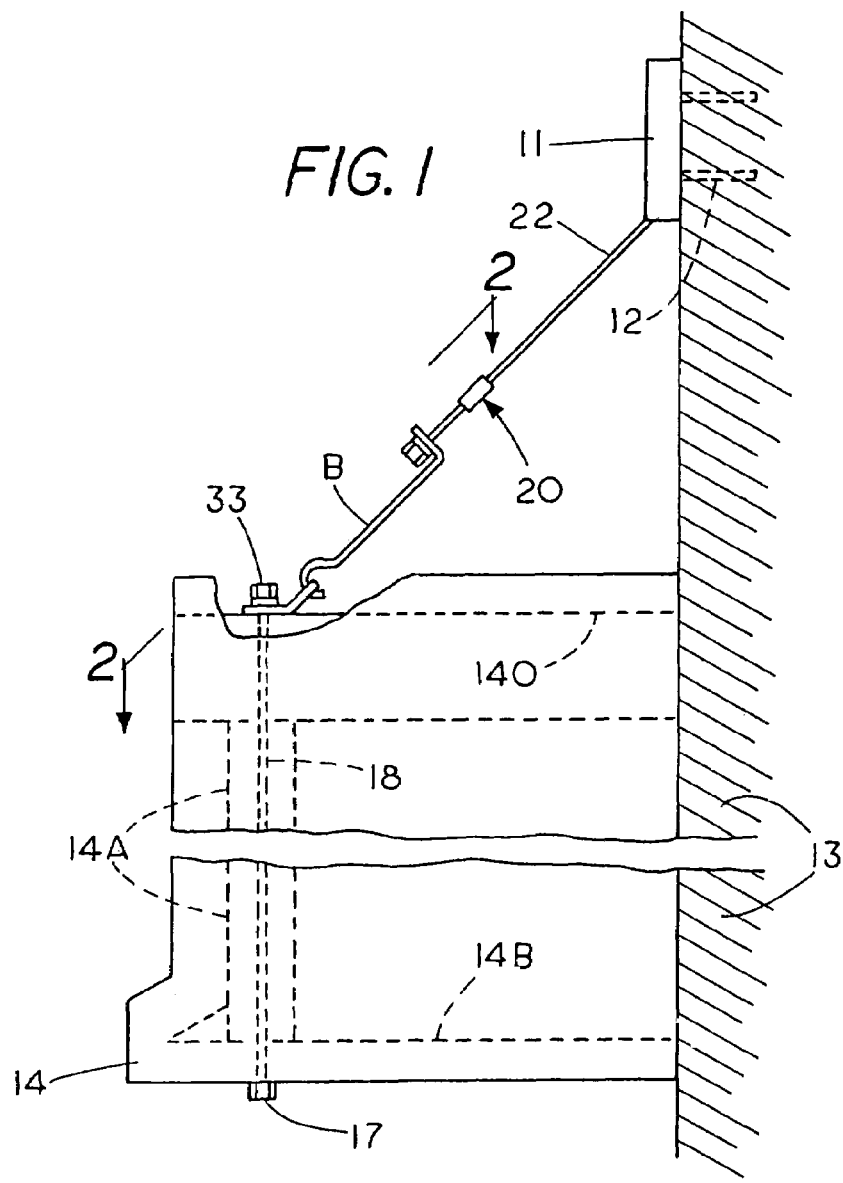
FIG. 1 is a somewhat diagrammatic showing of the use of the first embodiment of the cable bracket apparatus of this invention for supporting a bay window, only parts of the bay window being shown.

Referring to the drawings, and in particular to FIG. 1, there is diagrammatically shown a cable clamp or cleat 11 mounted by nails or screws 12 to an exterior wall 13 or to an overhanging part (not shown) of a building, for example a house, above a bow or a bay window 14 which is generally shown in outline other than for the dotted line showing of a mullion 14A, a seat board 14B, and a top board 14C of the window. The mullions 14A are remote from the house exterior wall. Rods and/or cables 18 are extended downwardly through the mullions while suitable fasteners 17, for example washers and nuts are mounted to the lower ends of the rods in supporting relationship to the seat boards.

For connecting the upper end of the rods to the clamps or cleats 11, there is provided the cable bracket mechanism, generally designated 20, of the first embodiment of this invention. The cable bracket mechanism includes an elongated flexible cable 22 which may be made of twisted metal strands and has one end portion secured to the exterior wall by a cable clamp or cleat 11 while the opposite end of the cable is extended into an axial bore (not shown) in the non-threaded end portion of an axially elongated metal stud, generally designated 23. The cable is suitably joined to the stud, for example by a swaging operation.

The end portion of the stud opposite the cable is threaded at diametrically opposed threaded parts 24 while diametrically opposed flats 25 extend between the diametric threaded parts. The threaded end portion of the stud is extended through an oblong cable stud aperture 27 that extends longitudinally through the flange 28 at one end of a longitudinally elongated bracket B of the first embodiment of the invention, the aperture being sufficiently spaced from the main body 29 whereby a nut 35 may be threaded thereon. Advantageously, the aperture 27 is of a size and shape to permit the stud threaded portion being moved through the aperture along the axial length thereof while preventing the stud being rotated relative to the flange.

The bracket B has the main body 29 that for the majority of its length is rectangular, has transversely spaced longitudinal edges 29E and is of a longitudinal length many times greater than its transverse width which in turn is many times greater than its thickness. The flange is at one longitudinal end of the bracket and is joined to one longitudinal end portion of the bracket main body 29 to extend at generally right angles thereto. The longitudinally opposite end portion of the main body becomes progressively more narrow along bracket end part 29A in a direction away from the flange. The main body has a generally planar surface 29C extending transversely between the main body longitudinal edges 29E from at least the narrow end part 29A to the flange and an opposite planar surface 29B that extends longitudinally from the narrow end part to the main body end portion to which the flange is joined. The narrow end part of the main body is integrally joined to the hook portion 30 which is reversely curved relative to the narrow end part. The hook portion opens in a direction generally toward an extension of the flange on the opposite side of the main body from which the flange extends to provide an eye bolt (bracket) opening 32C and has it terminal edge 30A being the opposite end of the bracket. Thus, the hook portion is curved such that after extending longitudinally away from the main body, is curved to extend further away from the plane of the planar surfaces of the main body in a direction opposite the direction that the flange extends away from the main body planar surfaces and extends at least somewhat longitudinally toward the flange. Accordingly, at least part of one of the narrow end part 29A and the hook portion are in overlapping relationship to the free terminal transverse edge 30A of the hook portion which is spaced from the main body surface 29B. The terminal edge 30A in a longitudinal direction is more closely adjacent to the main body and the flange 28 than the part 30B of the hook portion that in a longitudinal direction is the most remote from the main body and flange.

The hook portion is extendable through the opening 31A in the leg 30B of the eye bracket 31. The eye bracket leg 31B is joined to eye bracket leg 31C which extends at an obtuse angle to leg 31B, for example about 160 to 105 degrees. The leg 31C is mounted to the window board 14C by having the rod extended though a rod aperture (not shown) in leg 31C and is removably retained in a mounted relationship thereto by fasteners such as a nut 33 threaded on the top end of the rod 18 to retain a washer 32 in abutting relationship to the member 14C of the window.

In using the apparatus of this invention, the eye bracket is attached to the window top board with the rod 18 extended through the rod aperture and the washer 32 and nut 33 mounted on the rod, the bracket hook portion is extended through the eye bracket aperture 31A, the threaded end portion of the stud is extended through the flange aperture and a nut 35 is threaded on the threaded end portion of the stud to be intermediate the flange and the bracket hook portion with there being a lock washer 37 between the flange and nut 35 and the free end portion of the cable attached to the wall 13 by the clamp and cleat 11 to retain the cable in a taut condition. Thereafter, the nut 35 is further threaded on the stud to increase the tension in the cable, or unthreaded an appropriate amount to decrease the tension in the cable, depending what is required to support the window in the desired condition. With more than one cable bracket mechanism being utilized, appropriate adjustments are made in each of the cable bracket mechanism used until the window is supported in a level condition at the elevation as desired.

Figure 4:
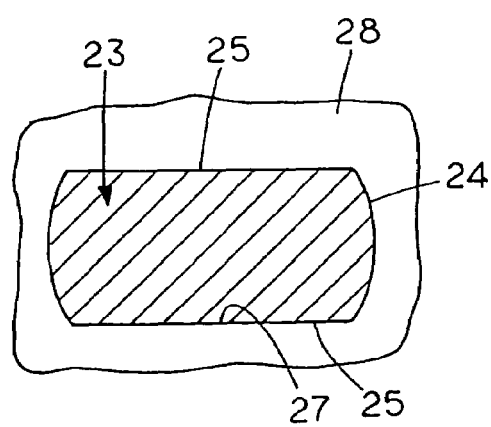
FIG. 4 is a transverse cross sectional view of the threaded stud of the first embodiment that is extended through an aperture in the bracket flange, said view being generally taken along the line and in the direction of the arrows 4-4 of FIG. 2.
Figure 3:
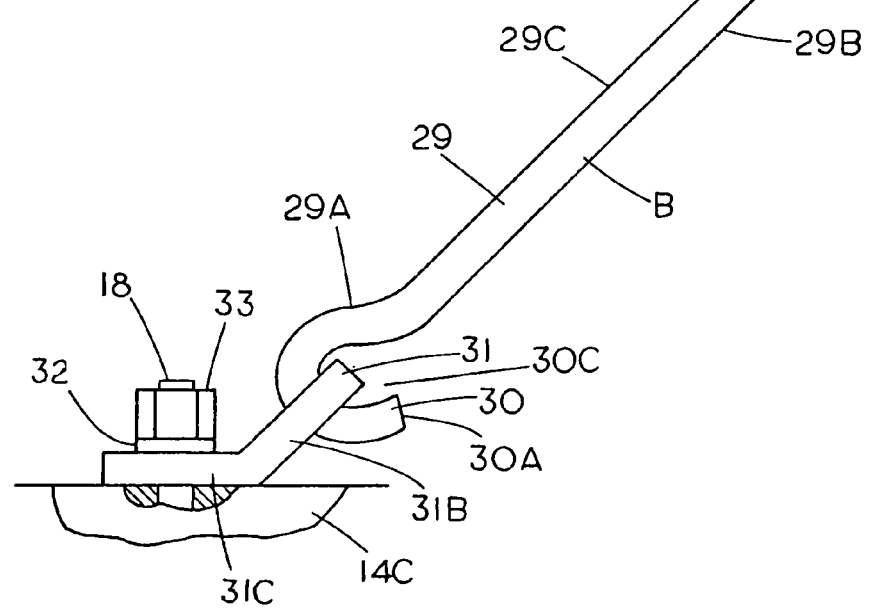
FIG. 3 is a fragmentary view that is generally taken along the line and in the direction of the arrows 3-3 of FIG. 2.

Advantageously, the bracket B is formed integrally as a single unitary unit. In place of the eye brackets being mounted to the rods 18, the eye brackets may be mounted to the window remote from the wall 13 by screws (not shown) extended through apertures in the eye bracket leg 31C. Additionally, instead of the narrow end part extending at an angle relative to the main body such as shown in FIG. 3, it may be at least in part a planar continuation of the rectangular portion of the main body, or as another alternative, the hook portion may be joined to the rectangular, planar main body portion and progressively curve to initially extend longitudinally away from the flange in a direction opposite that from which the flange extends away from the main body and thence in a direction toward an extension of the flange away from the main body on the opposite side of the main body from which the flange extends while at the same time being of a much narrower dimension than the transverse dimension of the main body rectangular portion. Also, in place of the threaded portion of the stud having flats and the bracket flange aperture being of a shape such as shown in FIG. 4, the second embodiment of the stud 40 and bracket E of the cable bracket mechanism may be the same as that of FIGS. 1-4 other than that the threaded portion 40A of the stud 40 is circular whereby the thread extends continuously helically around the stud, and the aperture 41 of the bracket flange 42 is circular and of a slightly larger diameter than the maximum diameter of the threaded portion.

Figure 6:
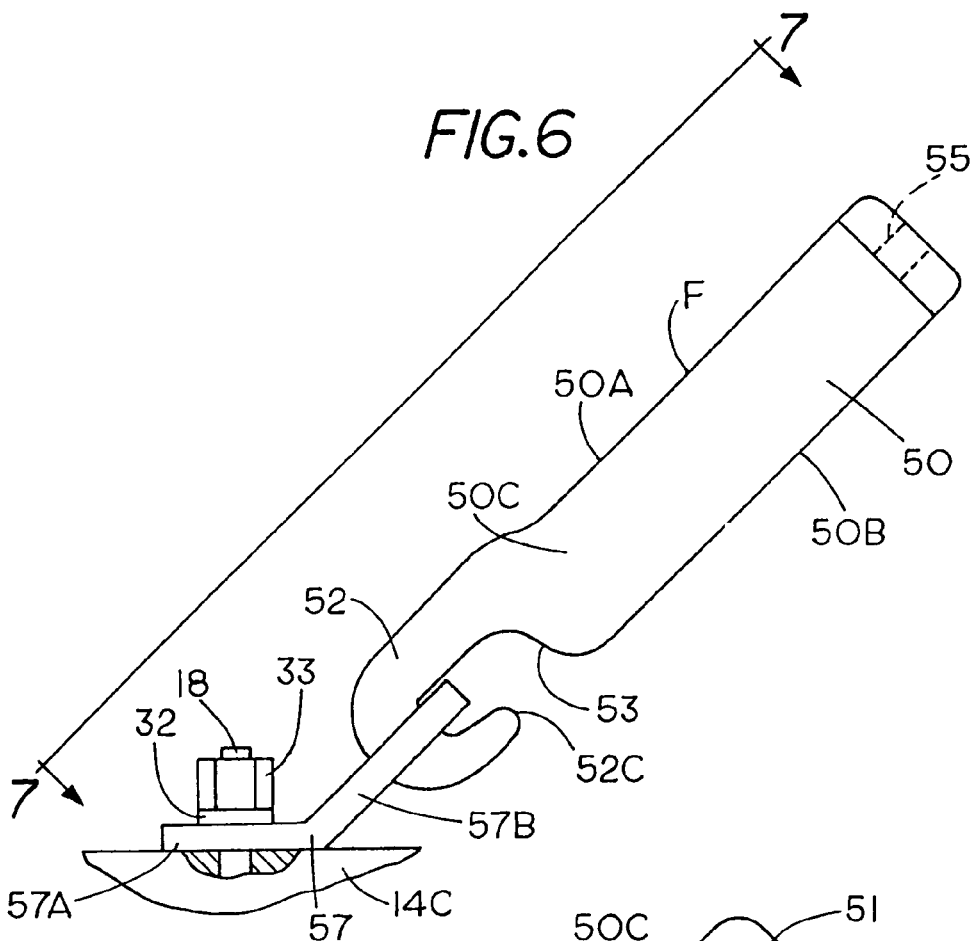
FIG. 6 is a side view bracket of the third embodiment of the invention hooked to an eye bracket.
Figure 7:
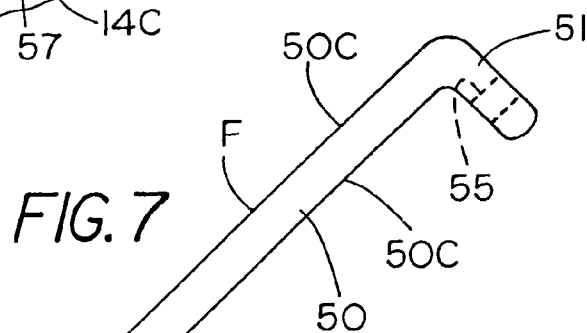
FIG. 7 is an edge view of the bracket of FIG. 6 that is taken along the line and in the direction of the arrows 7-7 of FIG. 6.
Figure 8:
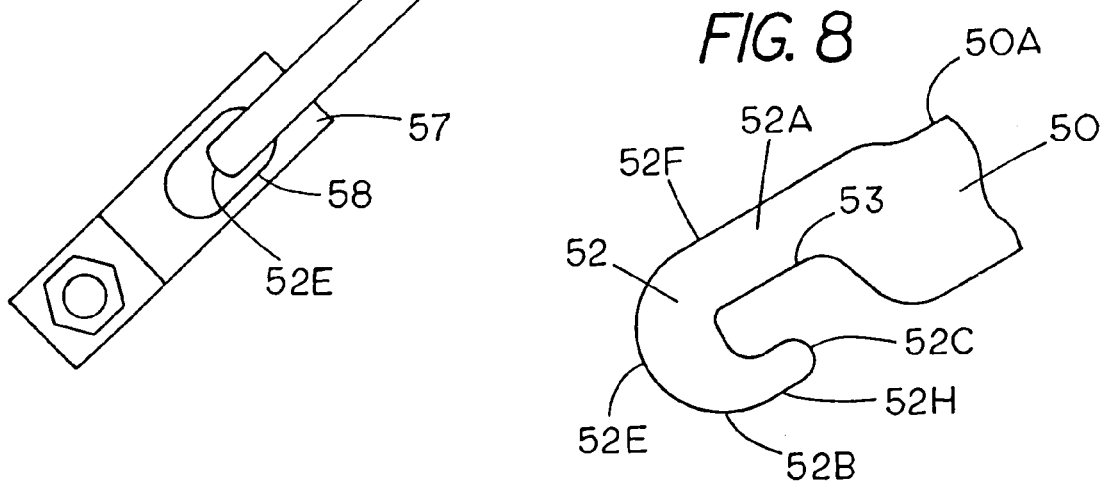
FIG. 8 is a fragmentary end portion of the bracket of FIG. 8.

Referring to FIGS. 6-8, the bracket F of the third embodiment of the invention has a main body 50 that for the majority of its length is rectangular, has transversely spaced longitudinal edges 50A, 50B and is of a longitudinal length greater than its transverse width which in turn is many times greater than its thickness. A flange 51 is joined to one longitudinal end portion of the bracket main body 50 to extend at generally right angles thereto or slightly less than 90 degrees, for example 83 to 85 degrees. The longitudinally opposite end portion of the main body is integrally joined to one end portion of the bracket hook end portion 52. The main body and hook portion have coextensive generally planar surfaces 50C extending transversely between the main body longitudinal edges 50A, 50B and the hook portion longitudinal edges 52F, 52H from closely adjacent to the flange to the longitudinally opposite end 52E of the bracket.

The hook portion at its juncture to the main body is substantially the same transverse width as the main body and thence is of a narrow width to extend longitudinally away from the flange along portion 52A and thence is reversely curved along portion 52B to extend longitudinally back toward the main body. The terminal edge part 52C of the reversely curved portion that is the most remote from its juncture to the longitudinal portion 52A in a longitudinal direction is more closely adjacent to the main body and the flange 51 than the part 52E of the hook portion that in a longitudinal direction is the most remote from the main body and flange. The part 52E is the end of the bracket F that is longitudinally most remote from the flange.

The hook portion provides a slot (eye bolt opening) 53 that opens transversely outwardly in a transverse direction opposite the extension of main body edge 50B and transverse edge 52F, is longitudinally elongated in a direction away from the flange 51 and extends longitudinally more remote from the flange than part 52C and its transversely outwardly opening which is transversely remote from the longitudinal portion 52A. Thus, the slot is somewhat J-shaped.

Figure 5:
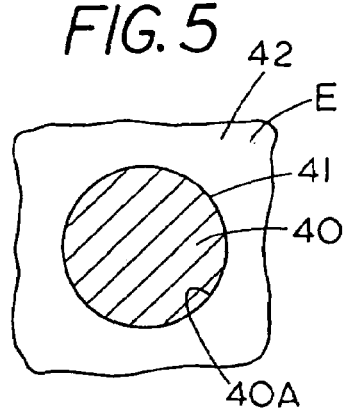
FIG. 5 is a cross sectional view that is generally the same as that of FIG. 4 other than it is of a second embodiment.
Figure 2:
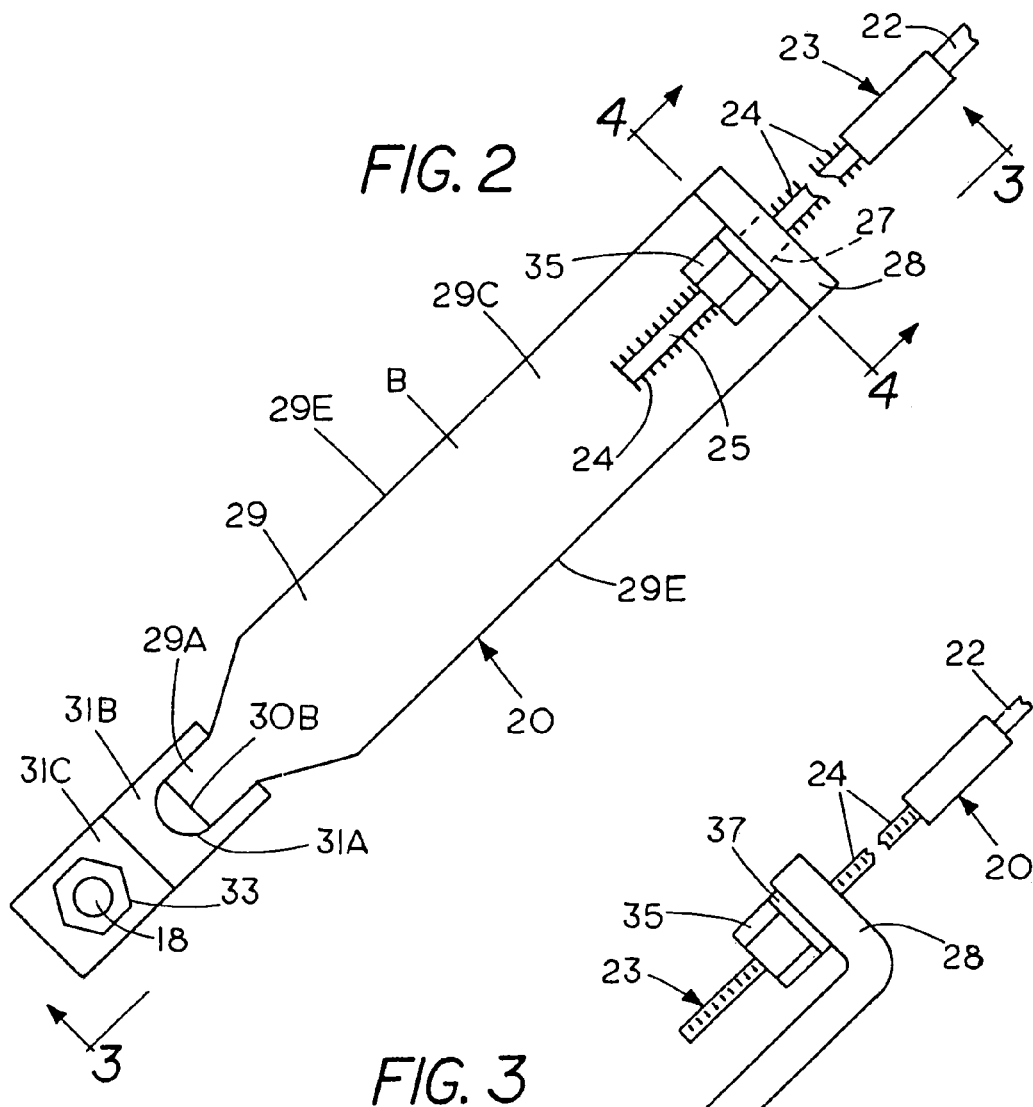
FIG. 2 is a fragmentary view of the first embodiment of the bracket and structure that is connected to opposite ends of the bracket, said view being taken along the line and in the direction of the arrows 2-2 of FIG. 1.

The flange 51, which is at one longitudinal end of the bracket, is provided with a stud aperture 55 extending longitudinally therethrough. The aperture 55 may be circular similar to that shown in FIG. 5, or non-circular, for example similar to that shown in FIG. 4, depending upon the cross sectional shape of the stud to be extended therethrough.

Advantageously, the bracket F is formed integrally as a single unitary unit. The hook portion 52A is extendable through the eye bolt opening 58 in the leg 57B of the eye bracket 57. The eye bracket leg 57B is joined to eye bracket leg 57A which extends at an obtuse angle to leg 57B, for example about 160 to 105 degrees. The leg 57A is mounted to the window board 14C in a similar manner to that described relative to the structure shown in FIGS. 2 and 3.

What is claimed is:

1. A cable bracket mechanism mountable to a building and attachable to one of a bay window and a bow window for aiding in supporting the window in at least one of a level condition and at a desired elevation from a location spaced from the building, comprising an elongated bracket having a longitudinally elongated main body that has a first end portion, a longitudinally opposite second end portion, a first transverse surface extending longitudinally between the main body first and second end portions and an opposite second transverse surface extending longitudinally between the main body first and second end portions, a flange joined to the main body first end portion to extend at generally a right angle away from the first transverse surface and a curved hook portion connected to the main body second end portion to open in a direction generally toward the flange and away from the main body second surface in a direction opposite from the direction that the flange extends away from the main body, the flange having a cable stud aperture extending longitudinally therethrough, an elongated stud having a first end portion which is at least partially circumferentially threaded and is extendable through the aperture and a second end portion, an elongated flexible cable having a first end portion joined to the stud second end portion, a nut threadable on the stud first end portion opposite the flange from the stud second end portion, an eye bracket having a first portion with an opening through which the hook portion is extendable and a second portion and means for securing the eye bracket second end portion to the window, the cable comprising twisted wire strands.

2. A building, one of a bay window and a bow window and means for aiding in supporting the window from the building and facilitating at least one of leveling and adjusting the elevation of the window, the means for aiding in supporting the window including an elongated bracket that includes a longitudinally elongated main body having longitudinally opposite first and second end portions, opposite first and second surfaces extending between the main body first and second end portion, a flange joined to the main body first end portion to extend at generally a right angle away from the main body and a hook portion connected to the main body second end portion to extend generally away from the flange and then is reversely curved to provide an eye bracket opening, the flange having an aperture extending longitudinally therethrough, an elongated stud having an elongated first end portion that is at least partially circumferentially threaded along the length thereof and movably extended through the flange aperture and a second end portion, an elongated flexible cable having a first end portion and a second end portion mounted to the stud second end portion, means for mounting the hook portion to the window remote from the building, the means for mounting the hook portion having an opening for having the hook portion removably extended therethrough and fastener means threadable on the stud first end portion and abuttable against the flange for adjusting the tension in the cable, and means for attaching the cable first end portion to the building.

3. The structure of claim 2 wherein the cable comprises twisted wire strands.

4. The structure of claim 2 wherein the means for mounting the hook portion includes an eye bracket having the last mentioned opening for the hook portion removably extended therethrough, the window has a mullion and a seat board and one of a cable and a rod mounting the eye bracket to the window, extending downwardly through the mullion and seat board and having a lower end and fastener means on the lower end in supporting relationship to the seat board.

5. The structure of claim 2 wherein the means for mounting the hook portion includes an eye bracket having a first leg and a second leg extending at an obtuse angle relative to first leg, the first leg having said opening and the second leg being mounted to the window.

* * * * *